United States Patent
Smythe et al.

(10) Patent No.: US 7,405,833 B2
(45) Date of Patent: Jul. 29, 2008

(54) METHOD FOR CALIBRATION AND REMOVAL OF WAVEFRONT ERRORS

(75) Inventors: Robert A. Smythe, Middletown, CT (US); Donald S. Battistoni, Farmington, CT (US)

(73) Assignee: Zygo Corporation, Middlefield, CT (US)

( * ) Notice: Subject to any disclaimer, the term of this patent is extended or adjusted under 35 U.S.C. 154(b) by 272 days.

(21) Appl. No.: 11/265,853

(22) Filed: Nov. 3, 2005

(65) Prior Publication Data

US 2006/0098209 A1    May 11, 2006

Related U.S. Application Data

(60) Provisional application No. 60/625,183, filed on Nov. 5, 2004.

(51) Int. Cl.
*G01B 11/02* (2006.01)
(52) U.S. Cl. .................................................. 356/514
(58) Field of Classification Search ................ 356/496, 356/510–514
See application file for complete search history.

(56) References Cited

U.S. PATENT DOCUMENTS

| | | | | |
|---|---|---|---|---|
| 5,473,434 A * | 12/1995 | de Groot | ..................... | 356/514 |
| 5,530,547 A * | 6/1996 | Arnold | ....................... | 356/458 |
| 5,583,632 A * | 12/1996 | Haga | .......................... | 356/129 |
| 5,650,853 A * | 7/1997 | Honda et al. | ................. | 356/514 |
| 5,784,164 A * | 7/1998 | Deck et al. | .................. | 356/511 |
| 6,304,330 B1 | 10/2001 | Millerd et al. | | |
| 6,548,312 B1 * | 4/2003 | Hayano et al. | ................. | 438/5 |
| 6,552,808 B2 | 4/2003 | Millerd et al. | | |
| 6,734,979 B2 * | 5/2004 | Evans et al. | ................. | 356/512 |
| 6,801,323 B2 | 10/2004 | Evans | | |
| 6,847,457 B2 | 1/2005 | Tobiason et al. | | |
| 6,850,329 B2 | 2/2005 | Tobiason et al. | | |
| 6,879,402 B2 * | 4/2005 | Kuchel | ....................... | 356/513 |
| 6,972,849 B2 * | 12/2005 | Kuchel | ....................... | 356/513 |
| 7,154,612 B2 * | 12/2006 | Freimann | .................... | 356/515 |
| 7,330,274 B2 * | 2/2008 | Hill | ............................ | 356/498 |

OTHER PUBLICATIONS

Takeda, Ina, and Kobayashi; Fourier-transform method of fringe-pattern analysis for computer-based topography and interferometry; Jan. 1982, Journal of the Optical Society of America, vol. 72, No. 1, pp. 156-160.*

Evans, Compensation for errors introduced by nonzero fringe densities in phase-measuring interferometers, Jan. 1993, Annals of the CIRP, vol. 42, pp. 577-580.*

Malacara and Devore, Optical Shop Testing, 1992, John Wiley & Sons, Inc., Chapter 13: Interferogram Evaluation and Wavefront Fitting.*

C.J. Evans, Compensation for Errors Introduced by Nonzero Fringe Densities in Phase-Measuring Interferometers, Annals of t he CIRP vol. 42/1/1993, Jan. 14, 1993.

(Continued)

*Primary Examiner*—Patrick Connolly
*Assistant Examiner*—Scott M Richey
(74) *Attorney, Agent, or Firm*—Francis J. Caufield

(57) ABSTRACT

Apparatus and methods for generating an empirically determined mathematical model of wavefront error in an interferometer as a function of aperture misalignment and then applying the model to correct subsequent measurements. The methods are useful in Fizeau and other types of interferometers in which carrier fringe analysis may be used for reducing errors caused by environmental and vibration effects.

10 Claims, 6 Drawing Sheets

OTHER PUBLICATIONS

A. E. Lowman, J. E. Greivenkamp, Interferometer induced wavefromt errors when testing in non-null configuration, SPIE vol. 2004 Interferometry VI: Applications (1993) / 173.

P. Hariharan, Achromatic Phase-Shifting for White-Light Interferometry, Supplement to Optics and Photonics News , vol. 7 No. 5 (May 1996).

C.J. Evans, Self-Calibration: reversal, redundancy, error separation, and "absolute testing", CIRP Annals, vol. 45/2 (1996).

C.J. Evans, Software based improvements in the accuracy of measurement of aspherics using a Fizeeau interferometer, Optical Fabrication and Test Workshop, NIST (1994).

\* cited by examiner

```
FlashErr.txt - Notepad
File Edit Format View Help

#FlashPhase Calibration Error File
#Instrument GPI CAN    Id 0 SN 012345

CameraRes      0.000253387
CameraSizeX    640
CameraSizeY    480

#Zernike Info
Radius  180.161
CenterX 288
CenterY 223 coma
z6                        4.47669         0.00295736
z7                       -7.90422        -0.0040035
z13                     -17.1263          0.0012254
z14                      20.1186         -0.00064686
z22                       5.91162         0.000405416
z23                      -3.86472        -0.000922141
z33                       1.17084        -8.04651e-005
z34                       1.91803        -0.000395028 astigmatism
z4        399235          0              -0.001143347
z5        -76271.9        0              -0.00509402
z11      -105582          0               0.00163473
z12       -37346.9        0               0.00119988
z20        32184.8        0               4.9516e-005
z21       371191.7        0              -0.000759947
z31       113321.2        0              -0.000668638
z32       -10469.9        0               0.000140596
```

Header Info · Coma · Astigm.

FIG. 10

METHOD FOR CALIBRATION AND REMOVAL OF WAVEFRONT ERRORS

CROSS REFERENCE TO RELATED APPLICATION

This application claims the benefit of priority from U.S. Provisional Patent Application No. 60/625,183 entitled METHOD FOR CALIBRATION AND REMOVAL OF WAVEFRONT ERRORS filed on Nov. 5, 2004, the entire contents of which are incorporated herein by reference.

FIELD OF THE INVENTION

This invention in general relates to interferometric metrology of surfaces and more particularly to interferometric apparatus and methods for comparing optical surfaces.

BACKGROUND OF THE INVENTION

The problem addressed by the invention is to compare two optical surfaces, spheres or aspheres, which have nominally the same shape. This may done with a Fizeau-interferometer system by placing the first surface—called the master calibration surface—in front of the Fizeau reference surface and making a measurement of the resulting phase-difference of the light reflected off the Fizeau-reference surface and the master calibration surface. This result is stored. Next, the master calibration surface is replaced by the second surface called the test—surface. Then another interferometric measurement is performed on the phase-difference of the light reflected off the Fizeau-reference surface and the test surface.

Subtracting the second measured phase-difference from the first measured phase-difference delivers the wanted deviation of the test surface from the master calibration surface. Typical interferometric systems, such as the Fizeau configuration, are designed for testing in the null condition, or aligned perfectly on axis. In certain data acquisition systems and in practical use (e.g., carrier-fringe analysis), misalignments are either required or common. These misalignments cause wavefront errors commonly called ray-mapping errors. Such wavefront errors are often large enough to degrade the performance of the interferometer. The correction of these ray-mapping errors extends the practical application of interferometers.

Consequently, it is a principal object of this invention to quantify ray mapping errors that are proportional to the amount of misalignment error in an interferometric system and provide a method to correct these errors.

It is yet another object of the present invention to provide a calibrated interferometer employing carrier fringe analysis while compensating for errors introduced by tilt.

It is yet another object of the invention to provide methods for calibrating an interferometer system in a very straight forward, deterministic, very cost effective, and elegant way.

Other objects of the invention will, in part, be obvious and will, in part, appear hereinafter when the following detailed description is read in conjunction with the accompanying drawings:

SUMMARY OF THE INVENTION

The invention relates to interferometric apparatus and methods for generating an empirically determined mathematical model of wavefront error as a function of aperture misalignment and then applying the model to correct subsequent measurements.

In one aspect of the invention, a high-speed interferometer for measuring surface profiles is provided comprising a reference leg including a reference object and a measurement leg in which the test surface is located. Means for aligning the test surface and reference object by setting the tilt and tip between them to be nominally zero are included. The test surface and the reference object are illuminated with a wavefront that is nominally of the same shape as that of the test surface to produce interference patterns containing information about the instantaneous wavefront difference between the reference object and test surface. A two-dimensional detector having a plurality of pixels, each corresponding to a respective location on the test surface, is used for converting the interferograms to electrical signals. Imaging optics, preferably with zoom capability, image the interference patterns on the two-dimensional detector during one frame thereof. Means for deliberately changing the relative tilt between the reference object and test surface by predetermined incremental amounts are provided to generate a series of calibration interferograms containing information about the wavefront differences between the reference object and test surfaces, including the influence of the incremental tilts. The calibration interferograms are analyzed by computer based software that also operates to generate error maps corresponding to the incremental tilts. Correction functions based on the error maps are generated for each incremental tilt angle and those correction functions are applied to a measurement of the test surface taken at a preferred tilt angle.

In another aspect, a method is described for measuring surface profiles, preferably using carrier fringe analysis, while correcting for tilt errors through the use of a calibration procedure that produces error compensation functions. The high-speed interferometric method of the invention for measuring surface profiles comprises the steps of providing a reference leg including a reference object and a measurement leg in which the test surface is located; aligning the test surface and reference object by setting the tilt and tip between them to be nominally zero; illuminating the test surface and the reference object with a wavefront that nominally is of the same shape as that of the test surface to produce interference patterns containing information about the instantaneous wavefront difference between the reference object and test surface; providing a two-dimensional detector having a plurality of pixels each corresponding to a respective location on the test surface; forming an image of said interference patterns on said two-dimensional detector during one frame thereof; deliberately changing the relative tilt between the reference object and test surface by predetermined incremental amounts to generate a series of calibration interferograms containing information about the wavefront differences between the reference object and test surfaces including the influence of the incremental tilts; analyzing said calibration interferograms and generating error maps corresponding to said incremental tilts; and generating correction functions based on said error maps for each incremental tilt angle and applying those correction functions to a measurement of the test surface taken at a preferred tilt angle.

BRIEF DESCRIPTION OF THE DRAWINGS

The structure, operation, and methodology of the invention, together with other objects and advantages thereof, may best be understood by reading the detailed description in connection with the drawings in which each part has an assigned numeral or label that identifies it wherever it appears in the various drawings and wherein:

FIG. 3b is a high level flowchart for correcting subsequent measurements based on the correction files generated in FIG. 3a;

FIG. 10 is a computer screen display showing the contents of a calibration error file.

DETAILED DESCRIPTION

Figure 1:
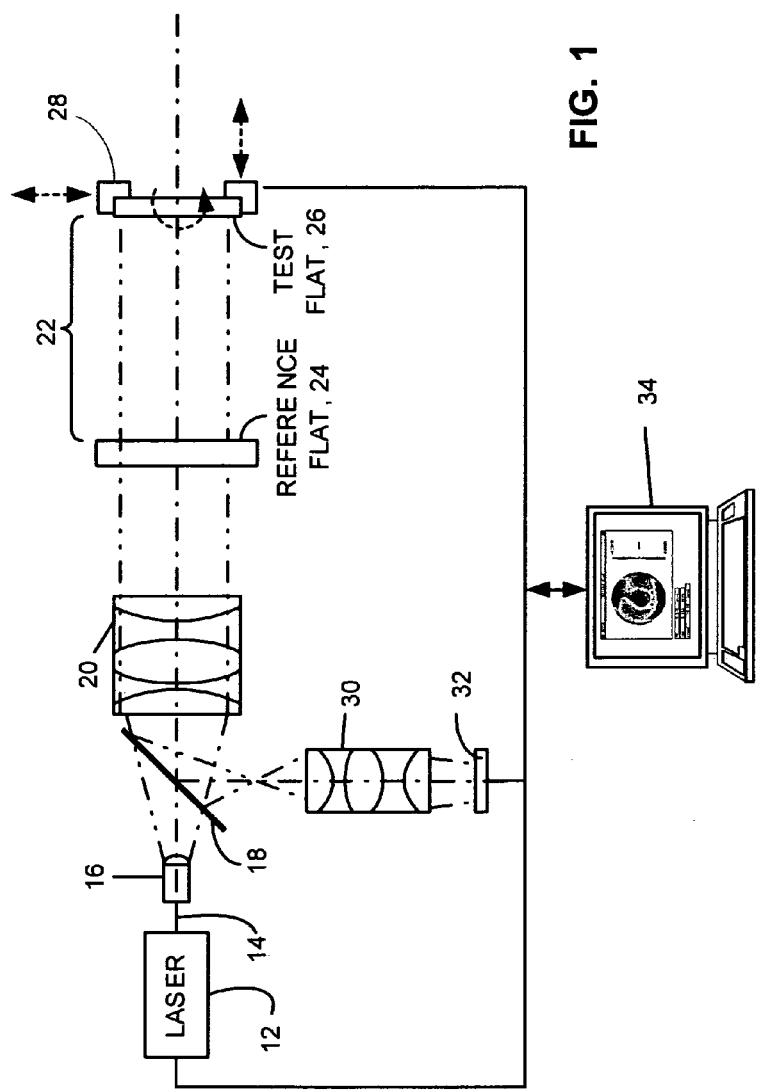
FIG. 1 is a diagrammatic view of a mainframe interferometer of the invention.

Reference is now made to FIG. 1, which shows an interferometer in accordance with the invention. The interferometer is generally designated at 10. While shown configured as a Fizeau capable of performing carrier fringe analysis to reduce sensitivity to environmental effects and vibration, the interferometer 10 need not necessarily be a Fizeau to practice the invention. Other types of interferometers, such as Tyman-Green, could also be beneficially employed. The major components of the interferometer 10 are a laser 12 that generates a beam 14 as a source of illumination followed downstream by beam expander and spatial filter combination 16 for diverging the wavefront from laser 12. Placed along this diverging beam is a beam splitter 18 that passes the diverging beam to a collimator 20 that shapes it into a plane wave front that eventually strikes a reference flat 24 and is partially reflected as a reference wavefront and partially transmitted downstream to impinge on a test flat 26 mounted on an adjustable part stage 28. The adjustable part stage 28 may be precisely manipulated by hand or under machine control to translate and rotate a part for alignment and measurement purposes. The intervening space between the reference flat 24 and test flat 26 forms the Fizeau cavity 22 of interferometer 10. After striking the test flat 26, the incoming test wavefront is reflected from the test surface as a distorted test wavefront carrying information about the test surface profile and any alignment errors. Both the reference and distorted test wavefronts are passed back upstream through the collimator 20 after which they are reflected from the beam splitter 18 to proceed as a combined beam, an interference pattern representing the differences in optical path length (OPD) between the interfering reference and distorted test wavefronts.

Interferograms thus formed are imaged onto a detector 32 via imaging optics 30, which are preferably provided with zoom capability in a well-known manner. The detector 32 is preferably a two-dimensional array of pixels each of which is imaged onto a corresponding portion of the test surface. The spatial frequency of the array of pixels is set to adequately resolve fringes in accordance with the desired precision for the measurement.

The detector 32 operates in a well-known manner to generate electrical-signals that carry information about the profile of the part, including any errors present from the interferometer itself. The electrical signals are passed to a processor, preferably in the form of a computer 34, that is provided with software instructions for implementing the methodology of the invention and for performing general control, housekeeping, and user interfacing functions via a graphical user interface (GUI).

Figure 2:
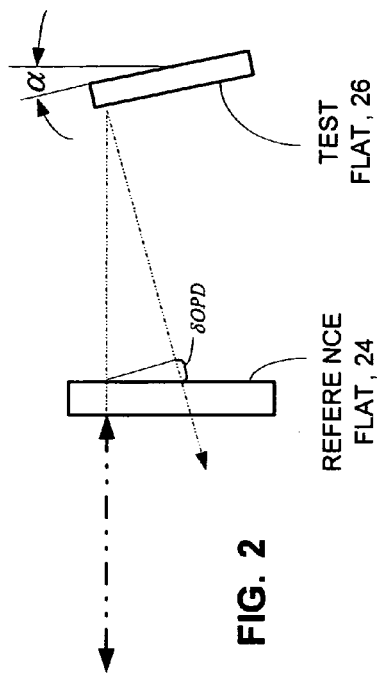
FIG. 2 is a diagrammatic illustration showing, in exaggerated fashion, wavefront errors that the invention corrects with calibration procedures.
Figure 6:
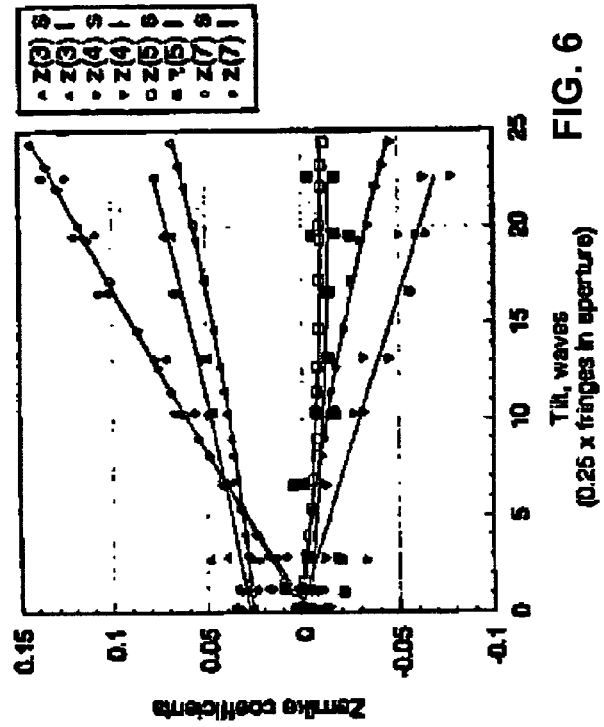
FIG. 6 is a plot showing variations in Zernike coefficients used to describe wavefronts generated by changing the tilt angle between reference and test flats in one configuration of the interferometer of the invention.

When the reference flat 24 and the test flat 26 are perfectly aligned, i.e., no tilt or tip exists between them, a null pattern of perfect uniformity prevails across the detector 32. However, the normal mode of operation for carrying out carrier fringe analysis to achieve high speed to avoid environmental and ambient vibration effects that can cause large errors requires the use of a tilt between the reference flat 24 and test flat 26 as shown in FIG. 2. While efficacious for achieving high speed, the presence of the tilt angle introduces ray tracing errors that cause an otherwise unwanted optical path difference (OPD) difference between the reference and test wavefronts. This OPD otherwise would not be present with perfect optics and alignment. This OPD difference occurs because the path of the test wavefront is different from that of reference wavefront as illustrated in FIG. 2 as δOPD, that varies with the tilt angle, α. The δOPD error which also varies across the wavefront may be conveniently expressed in terms of the well-known coefficients of Zernike polynomials. Such Zernike polynomial terms vary with tilt angle as shown in FIG. 6, for example, for different cavity spacings with Z(7) for coma being dominant and not changing with cavity length. While power Z(3) and astigmatism Z(4) in the horizontal direction show some change with cavity length, the influence of tilt is not a strong function of cavity length.

Figure 3A:
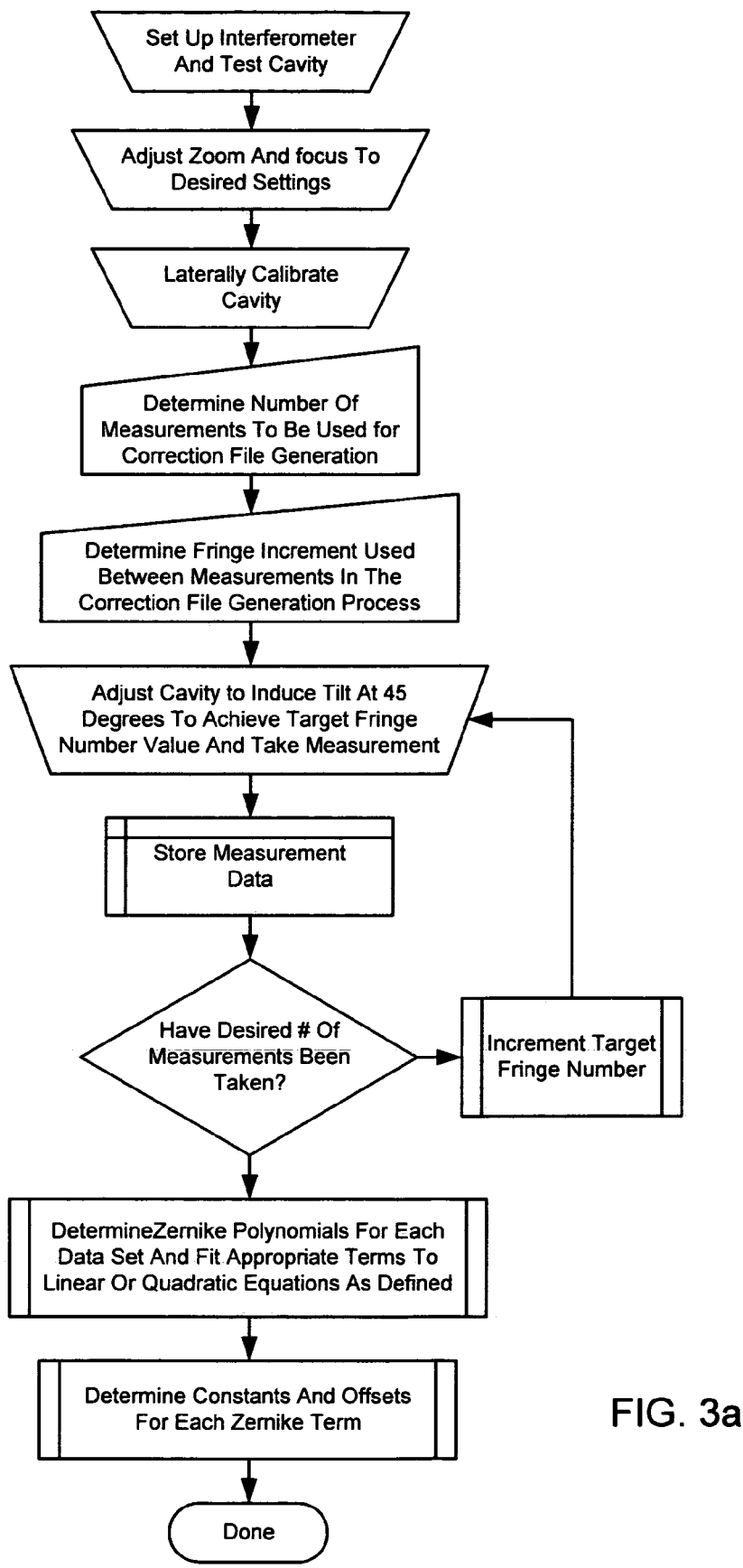
FIG. 3a is a high level flowchart for the generation of tilt induced correction files for practicing the invention.
Figure 3B:
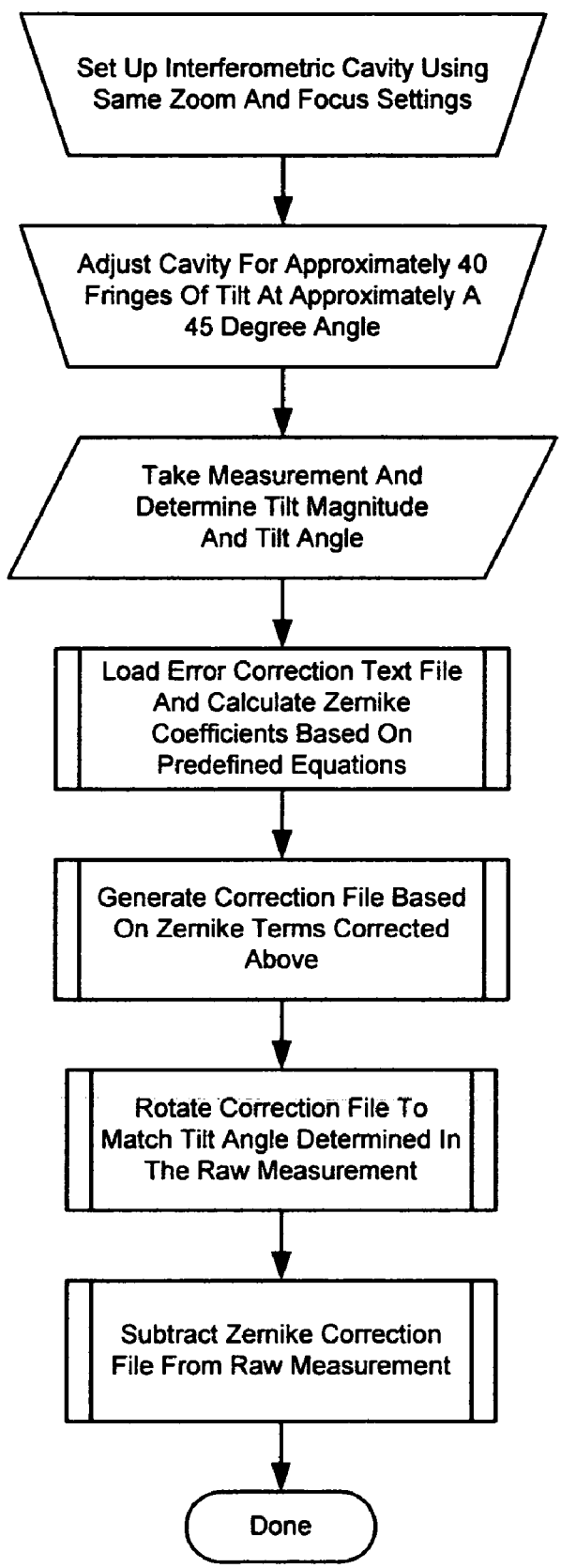
Figure 4:
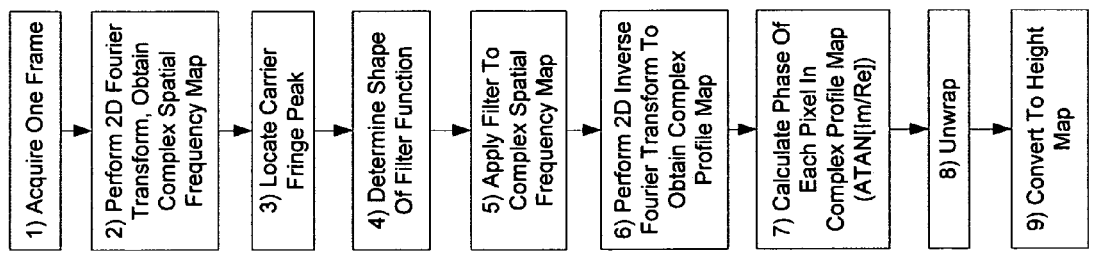
FIG. 4 is a flow chart showing in more detail a step that can be used to implement a measurement step of the flowcharts of FIGS. 3a and 3b in which carrier fringe analysis is carried out in practicing the invention.
Figure 9B:
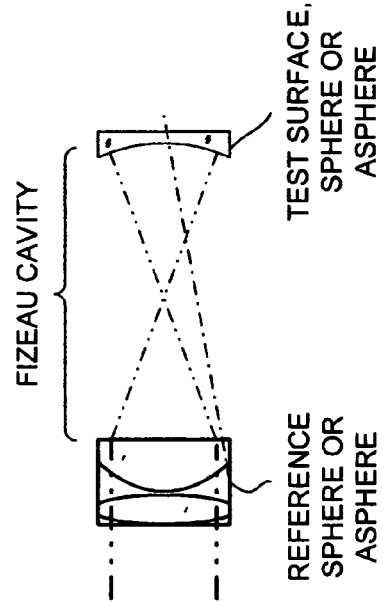
FIGS. 9a and 9b show in graphical form uncorrected and corrected interferograms in accordance with the invention.
Figure 9A:
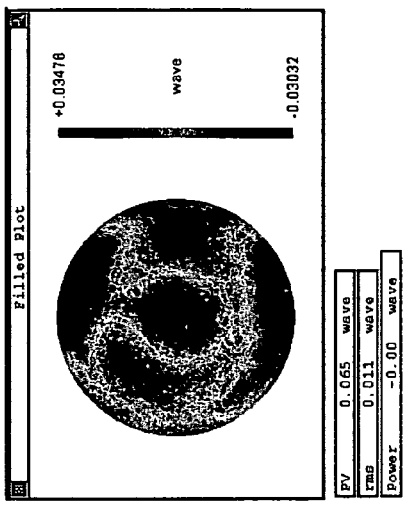
Figure 7:
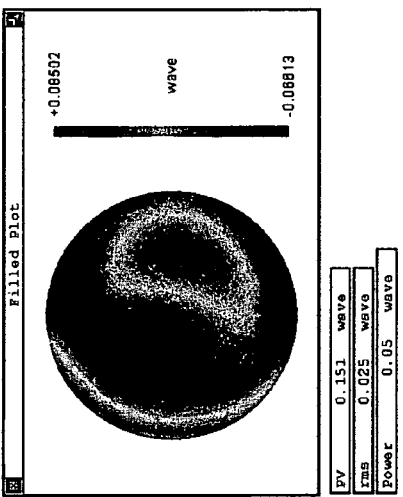
FIG. 7 is a computer screen display illustrating part of an alignment procedure used in practicing the invention.

An embodiment of the methodology of the invention for correcting the effects of ray tracing errors is to follow the procedure outlined in FIGS. 3a and 3b and 4 which can be implemented in computer software in a well-known manner. The procedure begins with the step of setting up the interferometer 10, adjusting zoom and focus, and then fixturing a test part on the adjustable stage 28 and aligning it by setting tilt and tip to zero. This is done by pressing the ALIGN/VIEW button on a stage remote control and aligning the part to the interferometer 10 by adjusting the tip and tilt knobs on the mount until the brightest spot is superimposed on the alignment crosshairs as shown in FIG. 7. The Align/View button is then pressed to put the interferometer 10 back in its view mode.

The next step involves laterally calibrating the interferometer image scale by reference to a known length. This is done by pressing and holding the left mouse button for computer 34 while drawing a line across the image area over an area of a known dimension. The mouse button is then released and the dimension of the line in millimeters is entered by pressing Enter. The calibrate window is then closed.

Figure 8:
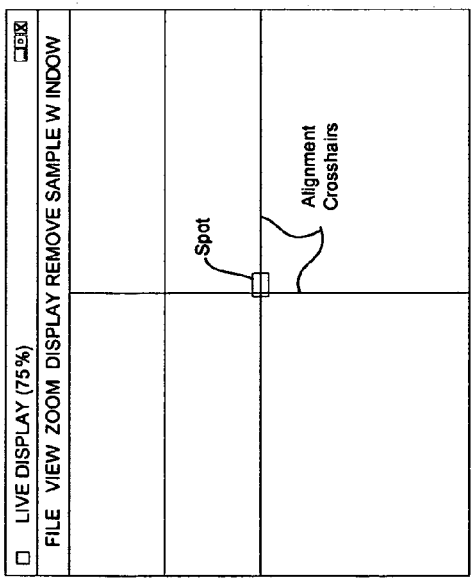
FIG. 8 is a computer screen display showing part of the method of FIGS. 3a and 3b.

Next, the calibration window is opened and the calibration sequence is begun. This is done by opening a Calibration window such as that shown in FIG. 8 that accounts in tabular form for each tilt angle increment, its status, and fringe pattern orientation.

Next, the number of measurements to be used for generating correction files is made after which the fringe increment to be used between measurements is set.

Following this, the cavity 22 is adjusted to induce tilt at 45 degrees to achieve target fringe number value and measurements are begun.

In the calibration window; a Measure 1 button is clicked to perform the first of a series of measurements by following on-screen instructions which prompt the operator to align the box to the crosshair in a Live Display FlashPhase Align screen.

From 3 to 6 calibration measurements are required; 5 are recommended, and 3 is a minimum. The number of fringes used for measurement 1 is based on the value entered in the Target Fringe Number control. Subsequent measurements increase the number of fringes by the value set in the Fringe Increment control. Subsequent measurements also add fringes.

The number of fringes to be used during testing should occur somewhere near the middle of all calibration measurements. For example, when the actual measurement uses 50 fringes, measurement 1 should start at 40 fringes (enter 40 in the Target Fringe Number control) and end around 60 with measurement 5 (enter 5 in the Fringe Increment control).

Figure 5:
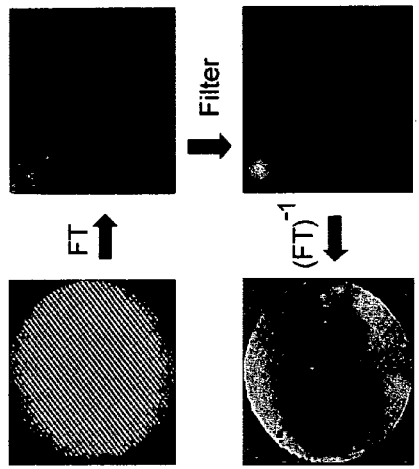
FIG. 5 is a graphical representation of the carrier fringe analysis method step of FIG. 4.

For each tilt angle calibration measurement, a carrier fringe analysis on its corresponding frame is carried out in accordance with the well-known sequence of steps 1) through 9) as set forth in further detail in FIG. 4 and in corresponding graphical form in FIG. 5 to generate a map of surface height with bit angle at each tilt angle. However, the use of carrier fringe analysis to practice the general approach of the invention is not mandatory since other forms of analysis such as phase shift interferometry (PSI) are also possible.

Each OPD map is then converted to Zernike polynomials (i.e., the Zernike coefficients as illustrated in FIG. 6 are determined and stored as a function of tilt angle in a .txt file such as that shown in FIG. 10).

The calibration sequence continues in the same manner to collect and store the desired number of measurements. With each succeeding measurement, the part tilt must be increased by the value in the Fringe Increment control. Any measurement can be redone by simply clicking a Measure X button again. Once the Zernike polynomials are determined, the data set is fit with appropriate linear or quadratic equations. Afterwards, constants and offsets are determined for each Zernike term.

The tilt from measurement to measurement must be within 3 degrees of fringe orientation angle −45 or 135 degrees (depending on correct tilt direction of the instrument) with the tilt being carefully adjusted for each tilt measurement.

The information contained in the .txt file is used to generate a "prescription" for the correction of subsequent measurements on the same or similar cavities (i.e. the same transmission element, zoom and focus settings, and the same type of part). Looking at the text file, there are three sections. The first is simply header information that is used to set the camera size and resolution as well as the pertinent Zernike polynomial information. The second and third sections are the actual data used for the correction. Each of these sections has four columns. The first column shows the Zernike terms used in the correction. The second column is the calculated constant used to correct the Astigmatism terms. The third column is the calculated constant used to correct the Coma terms. The final column is the offset that is applied to each Zernike term. While coma and astigmatism only are listed in the text file, it should be clear that other Zernike coefficients such as defocus, spherical, and higher order terms can be included as well.

Once the Zernike coefficients are stored as a function of tilt angle, a correction file is created by using the data previously acquired and stored in the .txt file, and the correction file is used to remove errors introduced by the tilt angle at which subsequent measurements are to be taken.

A sequence for making subsequent measurements is illustrated by the sequence of steps of FIG. 3b which involves first setting up the interferometric cavity using the same zoom and focus settings as were used in generating a .txt file. The cavity 22 is then adjusted for approximately 40 fringes of tilt at approximately a 45-degree angle.

A measurement is then made, and the tilt magnitude and angle are determined. Again carrier fringe analysis may be employed to do this. Following this the error correction, text file data is loaded and Zernike coefficients based on predefined equations are calculated. Again, carrier fringe analysis may be used to carry out this step.

Having the Tilt Magnitude, the Zernike correction file is generated according to the following formulae:

$$b_{zn}*\text{TiltMag}+c \qquad \text{Coma Terms}$$

$$a_{zn}*\text{TiltMag}^2+c \qquad \text{Astigmatism Terms}$$

Where:
$b_{zn}$=the coma Zernike terms in Column 3
$a_{zn}$=the Astigmatism Zernike terms in Column 2
c=the Zernike Offset values in Column 4

When subsequent measurements are taken, the TiltMag result is calculated and a Correction file is generated based on applying the equations above to each term noted in the correction file. The TiltAngle (i.e., direction of tilt) is also predetermined and the generated Zernike file is rotated to match the measured TiltAngle. The generated Zernike file is then subtracted from the measurement to eliminate the error associated with tilting the part off axis.

Figure 11:
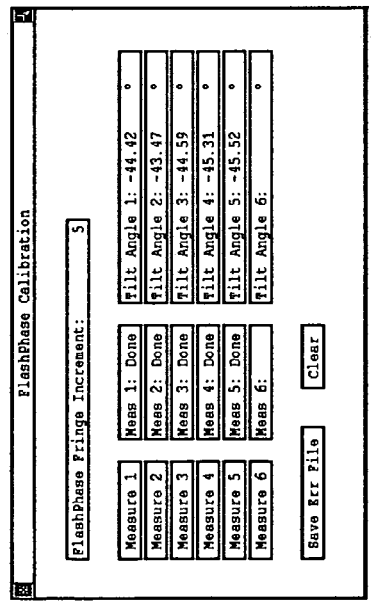
FIG. 11 is an alternative interferometer cavity architecture for practicing the invention in the measurement of spheres or aspheres.

The method may be employed to measure spheres and aspheres when the instrument cavity is reconfigured as shown in FIG. 11 where the references and test surfaces are no longer flats, but now may be spherical or aspherical in shape. Here, similar calibration procedures are followed.

In general, this method improves the uncertainty of the measurement by removing systematic errors due to errors in ray mapping. For instantaneous phase measuring interferometry data acquisition (IPMI), misalignment is required. This method removes the errors-caused by this requirement and improves:ease of use of the instrument by making alignment less critical while maintaining low uncertainty of measurement. This is a self-referencing calibration method, which provides lower measurement uncertainty than external calibration methods based on a secondary standard.

Having described the invention with reference to particular embodiments, variations of it will occur to those skilled in the art based on its teachings and such variations are intended to be within the scope of the invention.

What is claimed is:

1. A high-speed interferometer for measuring surface profiles, said high-speed interferometer comprising:
   a reference leg including a reference object and a measurement leg in which the test surface is located;
   a source for illuminating both the test surface and the reference object with a wavefront that nominally is of the same shape as that of the test surface to produce interference patterns containing information about the instantaneous wavefront difference between the reference object and test surface;

a part stage for selectively moving the test surface relative to the reference object to align the test surface and reference object by setting the tilt and tip between them to be nominally zero, deliberately changing the relative tilt between the reference object and test surface by predetermined incremental amounts to generate a series of calibration interferograms containing information about the wavefront differences between the reference object and test surfaces including the influence of the incremental tilts, and to selectively orient the test surface and reference object to make measurements;

a two-dimensional detector having a plurality of pixels each corresponding to a respective location on the test surface;

optics for forming an image of said interference patterns on said two-dimensional detector during one frame thereof; and a processor for analyzing said calibration interferograms, generating error maps corresponding to said incremental tilts, generating correction functions based on said error maps for each incremental tilt angle, and applying those correction functions to a measurement of the test surface taken at a predetermined measurement tilt angle.

2. The high-speed interferometer of claim 1 wherein said reference and measurement legs are configured and arranged in the form of a Fizeau cavity.

3. The high-speed interferometer of claim 1 wherein said optics have zooming capability.

4. The high-speed interferometer of claim 1 wherein the elements thereof are configured and arranged to perform carrier fringe analysis to reduce sensitivity to environmental effects and vibration.

5. The high-speed interferometer of claim 1 wherein said processor is configured to generate said correction functions as Zernike polynomial terms.

6. A high-speed interferometric method for measuring surface profiles, said high-speed interferometric method comprising the steps of:

providing a reference leg including a reference object and a measurement leg including a test surface;

illuminating both the reference object and the test surface and with a wavefront that is nominally of the same shape as that of the test surface to produce interference patterns containing information about the instantaneous wavefront difference between the reference object and test surface;

selectively moving the test surface relative to the reference object to align the test surface and reference object by setting the tilt and tip between them to be nominally zero, deliberately changing the relative tilt between the reference object and test surface by predetermined incremental amounts to generate a series of calibration interferograms containing information about the wavefront differences between the reference object and test surfaces including the influence of the incremental tilts, and selectively orienting the test surface and reference object to generate a measurement interferogram;

imaging said calibration interferograms on a two-dimensional detector having a plurality of pixels, each corresponding to a respective location on the test surface, during one frame thereof; and analyzing said calibration interferograms, generating error maps corresponding to said incremental tilts, generating correction functions based on said error maps for each incremental tilt angle, and applying those correction functions to a measurement of the test surface taken at a predetermined measurement tilt angle.

7. The high-speed interferometeric method of claim 6 wherein said calibration interferograms are analyzed with carrier fringe analysis to reduce sensitivity to environmental effects and vibration.

8. The high-speed interferometric method of claim 6 wherein said correction functions are Zernike polynomials.

9. A high-speed interferometric method for measuring surface profiles, said high-speed interferometric method comprising the steps of:

setting up an interferometric cavity for a reference object and test object using predetermined zoom and focus settings;

adjusting the cavity for approximately 40 fringes of tilt at approximately a 45 degree angle;

taking a measurement and determining the tilt magnitude and tilt angle;

loading an error correction text file into a computer and calculating Zernike coefficients based on predefined equations;

generating a correction file based on the preceding calculated Zernike coefficients;

matching the calculated Zernike coefficients to a corresponding tilt angle determined in a raw measurement; and subtracting the correction file from the raw measurement.

10. The high-speed interferometric method of claim 9 wherein the tilt magnitude and tilt angle are determined using carrier fringe analysis to reduce sensitivity to environmental effects and vibration.

* * * * *